United States Patent [19]

Lemond et al.

[11] 4,286,398
[45] Sep. 1, 1981

[54] APPARATUS FOR EXCAVATING AND TRANSPLANTING TREES AND THE LIKE

[75] Inventors: Phillip E. Lemond; S. Donald La Shomb; Oliver R. Rowe, Sr., all of Charlotte, N.C.

[73] Assignee: Rowe Corporation, Charlotte, N.C.

[21] Appl. No.: 75,102

[22] Filed: Sep. 13, 1979

[51] Int. Cl.³ .............................................. A01G 23/04
[52] U.S. Cl. ....................................... 37/2 R; 83/928
[58] Field of Search ..................... 37/2 R, 2 P; 83/928

[56] References Cited

U.S. PATENT DOCUMENTS

| 3,427,734 | 2/1969 | Eberhart | 37/2 R |
| 3,618,234 | 11/1971 | Bates | 37/2 R |
| 3,936,960 | 2/1976 | Clegg | 37/2 R |

FOREIGN PATENT DOCUMENTS

| 685715 | 5/1964 | Canada | 37/2 R |
| 880069 | 9/1971 | Canada | 37/2 R |
| 2353828 | 10/1973 | Fed. Rep. of Germany | 37/2 |

*Primary Examiner*—E. H. Eickholt
*Attorney, Agent, or Firm*—Richards, Shefte & Pinckney

[57] ABSTRACT

An apparatus for excavating and transplanting trees includes a plurality of blade assemblies mounted on the sides of a horizontal multi-sided frame for overlying and substantially surrounding an excavation site. Each blade assembly includes a housing within which a flanged blade and stem unit can be mounted for reciprocation to effect penetration of the excavation site, and a hydraulic cylinder and piston assembly detachably affixable to the stem for effecting reciprocation of the blade and stem unit. Within each housing are mounted a plurality of rollers engageable with opposite sides of the blade thereof, a pair of guide blocks adjacent opposite sides of the blade flange, and a pair of guide bars on opposite sides of the stem, all cooperable to guide and maintain the blade and stem unit in an established path during reciprocation. Associated with each housing is one curved and one straight blade and stem unit selectively and alternately mountable therein for reciprocation, the arcuate blades, when mounted in the housings and reciprocated, following arcuate paths to remove a generally conical section from the excavation area and the straight blades, when so mounted and reciprocated, following straight paths to remove a frusto-conical or frustum-shaped section from the excavation area.

13 Claims, 13 Drawing Figures

APPARATUS FOR EXCAVATING AND TRANSPLANTING TREES AND THE LIKE

BACKGROUND OF THE INVENTION

The present invention relates to improvements in devices for excavating and transplanting trees and similar plants, and mor particularly to apparatus of the type having a multi-sided horizontally disposed frame for overlying and substantially surrouding an area to be excavated on which frame is mounted a plurality of blade assemblies each of which includes a reciprocable blade for penetrating the area to be excavated.

Heretofore, a variety of apparatus having a plurality of reciprocal blades arranged for reciprocation in converging relationship have been available for various plant excavational uses, primarily the planting and transplanting of trees and the like. Representative examples of such conventional equipment are disclosed in Bates U.S. Pat. No. 3,618,234, and May U.S. Pat. No. 3,775,876. Traditionally, hydraulic cylinders are utilized to effect reciprocation of the blades. In many of the conventional devices the hydraulic cylinder is operatively affixed directly to the blades, as is illustrated and described in both the aforesaid Bates and May patents, while in other prior art devices a straight stem is affixed to and extends upwardly from each blade thereof, the hydraulic cylinders of these devices being operatively affixed to the blade stems. In many of the above-mentioned conventional machines, the blades utilized therein generally fall within two categories: (1) blades which are longitudinally straight and slightly curved or perhaps V-shaped in transverse cross-section, as disclosed, for example, in the Bates patent, and (2) blades which are spoon-shaped, as disclosed, for example, in the May patent.

In the conventional use of these devices, either conically-shaped or frustum-shaped sections of earth may be removed from the area being excavated, depending upon the angular orientation of the blades of the particular device used with respect to the area being excavated. In some of the prior art devices heretofore available, the angular relationship of the blades with respect to the excavation area is selectively variable to allow removal thereby of either a conical or frustum section of earth, as desired. One example of a means for so varying the angular relationship of the blades to the excavation area is disclosed in the May patent, although May is intended primarily for use in removing a conical or somewhat semispherical section. Although the devices permitting such adjustment provide a degree of use flexibility not available in similar non-adjustable devices, the readjustment and syncronization of the angular relationship of each individual blade with respect to the excavation area is required each time such a change is made to insure that the blades converge properly during reciprocation thereof, a process which can be very time consuming.

Additionally, since a majority of these prior art devices utilize straight blades having straight stems affixed thereto which must be oriented relatively acutely with respect to the excavation area to facilitate removal of a conical section of earth, the horizontal dimension between the upwardly extending ends of the stems thereof may be nine feet or greater in non-adjustable devices designed to remove conically-shaped sections of earth or in adjustable devices when the blade and stem units thereof are adjusted to facilitate excavation and removal of a conical section of earth. As a result, such devices cannot be readily maneuvered or used in confined areas or closely adjacent to trees, buildings or other immovable obstacles which may be located close to the tree to be excavated. This problem makes such devices particularly disadvantageous for use in nurseries where it is desirable to plant and cultivate trees as closely as possible to utilize the available land most efficiently. Because of the space required for maneuvering and positioning conventional devices to remove such trees, the trees must be planted a greater distance apart than would generally be desirable from the standpoint of utilizing available space in the most efficient manner possible. Moreover, this horizontal dimension may exceed the maximum allowable width dimension permitted by the transportation departments of many states for the transportation of such equipment on the highways thereof. Thus, in order to facilitate transportation of such devices within prevailing guidelines, the devices must either be provided, in the case of non-adjustable devices, with an appropriate mechanical arrangement allowing the blade and stem units thereof to be pivoted inwardly or otherwise temporarily contracted or, in the case of adjustable devices, be adjusted to facilitate excavation of a frustum-shaped section prior to transportation thereof.

Conventional excavational equipment of all types is also plagued by problems inherently created by the need in such equipment for appropriate structural arrangements for guiding and maintaining the blades thereof in a regular and established path of movement during their reciprocation which will prevent deviative movement of the blades and resist the binding thereof under load while permittting the blades to reciprocate freely. In devices heretofore available, longitudinal guide tracks or guide channels of various sorts have been utilized in combination with pins, rollers or comparable elements affixed to the blades thereof for riding in the tracks or channels in an effort to satisfy this need. Examples of this type of guiding arrangement are disclosed in both the Bates and May patents. However, blade guiding arrangements of this type have encountered problems related to their intended function. In order for any type of guide assembly utilizing a guide channel or track in which rides a roller or the like to satisfactorily guide the element riding therein while also resisting deviative movement thereof, relatively close tolerances must be provided between the guide channel and the element riding therein. However, as these tolerances are reduced, the tendency of the riding element to bind in the guide channel under load increases. As a result, the effectiveness of a guide channel type guiding assembly in excavational equipment of the type concerned herein in resisting deviative movement of the blades thereof during their reciprocation must be compromised to facilitate acceptable functioning of the device as a whole.

In contrast to the above, the present invention provides a unique blade unit guiding and aligning assembly utilizing a plurality of rollers and guide blocks positioned to engage the blade immediately adjacent the location at which it penetrates the ground to guide and maintain the blade and stem unit during reciprocation thereof in a regular and established path of movement while resisting and minimizing the creation under load of not only frictional and binding forces on the blade and stem but also of torsional forces, all without using any form of longitudinally extending guide channel or track. Additionally, the present invention provides a novel arc-shaped blade and stem unit which is curved longitudinally along the entire extending length thereof so as to follow a generally arcuate path upon reciprocation thereof to permit excavation of a generally conically-shaped section. The arc-shaped configuration of the blade and stem units significantly reduces the horizontal distance between the upwardly extending ends thereof, thereby permitting greater maneuver ability and use of the present invention in confined areas or adjacent buildings, trees, or other obstacles, making the present invention particularly advantageous for use by nurseries where excavation of trees growing closely together is required. Moreover, the blade unit guiding assembly is constructed to accept either the arc-shaped blade and stem unit or a conventional straight blade and stem unit interchangable without requiring any adjustment in either the guiding assembly itself or the angular relationship of the blade and stem unit and the guiding assembly with respect to the excavation area, thereby rendering the present invention equally operable in confined areas for removing either a conical or a frustum-shaped section of earth, and eliminating the need for special preparation of the equipment to facilitate transportation thereof.

SUMMARY OF THE INVENTION

The present invention provides an apparatus for excavating and transplanting trees and the like having a generally horizontally disposed multi-sided frame defining a substantially enclosed space for overlying and substantially surrounding an area to be excavated. A plurality of blade assemblies are mounted on the sides of the frame, each blade assembly including a housing mounted on the frame and having a downwardly facing opening within which housing is disposed a blade reciprocable thrugh the downwardly facing opening thereof for penetrating the area to be excavated. An actuator for imparting reciprocal movement to the blade, preferably a hydraulic actuator such as a hydraulic cylinder and piston assembly, is operatively associated with the blade, preferably by operative affixation to a stem affixed to and extending upwardly from the blade through an upwardly facing opening in the housing for reciprocation therewith. A structural assembly is also provided for guiding and aligning the blade during reciprocation thereof to prevent deviative movement thereof. The guiding and aligning structural assembly includes a plurality of rollers rotatably mounted in the housing adjacent the downwardly facing opening thereof in rotational engagement with opposite sides of the blade during reciprocating movement thereof. In this manner, the plurality of rollers guides the blade immediately adjacent the point at which it penetrates the area to be excavated and thereby guides the blade along a regular and established path of movement while resisting torsional, binding and frictional forces imposed on the blade during its penetration of the area to be excavated.

In the preferred embodiment of the present invention, the blade includes a flange formed thereon and extending in the direction of reciprocation along substantially the entire length of the blade. In conjunction with this, the guiding and aligning assembly also includes a plurality of guide blocks mounted in the housing immediately adjacent and on opposite sides of the flange of the blade to maintain the flange between the guide blocks during reciprocation of the blade to prevent any deviative sidewise movement of the blade while cooperating with the plurality of rollers to guide and maintain the blade in its regular and established path of movement. It is additionally preferred that the guiding and aligning assembly include a plurality of guide bars affixed to and extending across the housing adjacent the aforementioned upwardly facing opening thereof on opposite sides of the stem affixed to the blade to maintain the stem between the guide bars during reciprocation of the stem, whereby the guide bars cooperate with both the plurality of rollers and the plurality of blocks to guide and maintain the blade in its regular and established path of movement.

According to the preferred embodiment, a pair of blade units, each including a blade and a stem, is associated with each housing, the units being constructed for selective and alternate mounting in their respective housings for reciprocation therewithin and through the upwardly and downwardly facing openings thereof. One blade unit of each pair of blade units is substantially straight along the extending length thereof and the other unit of each pair is substantially arcuate along the extending length thereof. The hydraulic cylinder of each housing is pivotally attached thereto to facilitate attachment to either blade unit and includes a reciprocating member having an attachment assembly selectively engagable with either blade unit of the pair of blade units to effect reciprocation thereof. The aforementioned guiding and aligning assembly is constructed to accept either blade unit interchangably. The arcuate blade units, when mounted in the housing and reciprocated, follow arcuate paths for removing a generally conically-shaped section from the area to be excavated. The straight blade units, when so mounted and reciprocated, follow generally linear paths for removing a generally frusto-conically shaped section from the area being excavated.

DESCRIPTION OF THE PREFERRED EMBODIMENT

Referring now in greater detail to the accompanying drawings, the preferred embodiment of the present invention is illustrated and described herein in an apparatus for excavating and transplanting trees and the like utilizing three blade and stem units. However, as those skilled in the art will readily understand, the basic principles and concepts upon which the present invention is based may also be utilized in other excavating, transplanting, and similar applications without departing from the substance or scope of the present invention as defined in the appended claims. For example, the disclosed embodiment of the present invention shows apparatus having three blade and stem units, but the numbers of such units could be increased to four or more.

Figures 1, 3, 5, 6:
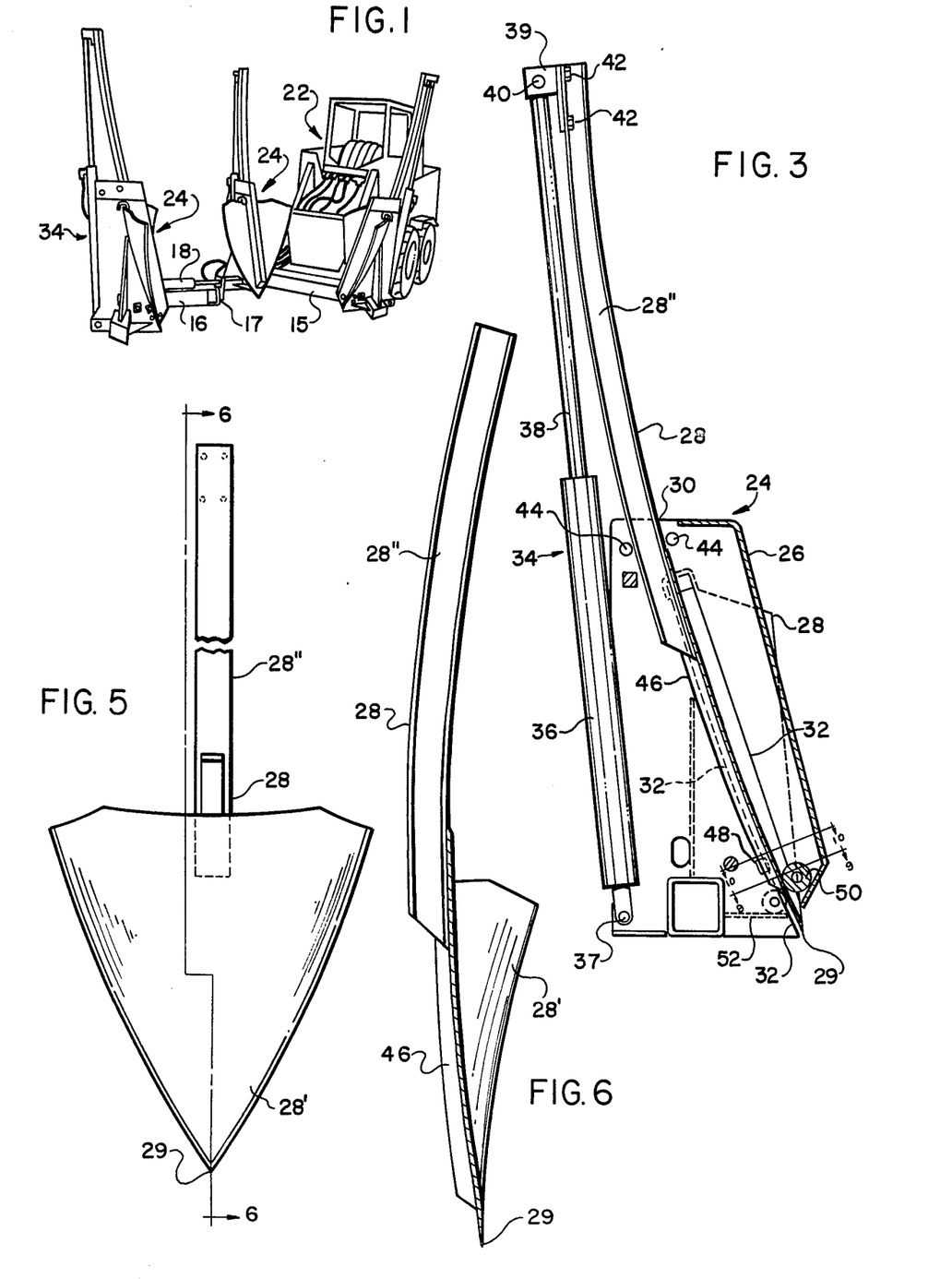
FIG. 1 is a perspective view of an excavating and transplanting apparatus according to the preferred embodiment of the present invention, shown attached to a vehicle.
FIG. 3 is a vertical sectional view of one of the blade assemblies of the apparatus taken along line 3—3 of FIG. 2.
FIG. 5 is a front elevational view of a curved blade unit of the present invention.
FIG. 6 is a vertical sectional view of the blade unit of FIG. 5 taken along line 6—6 of FIG. 5.
Figure 2:
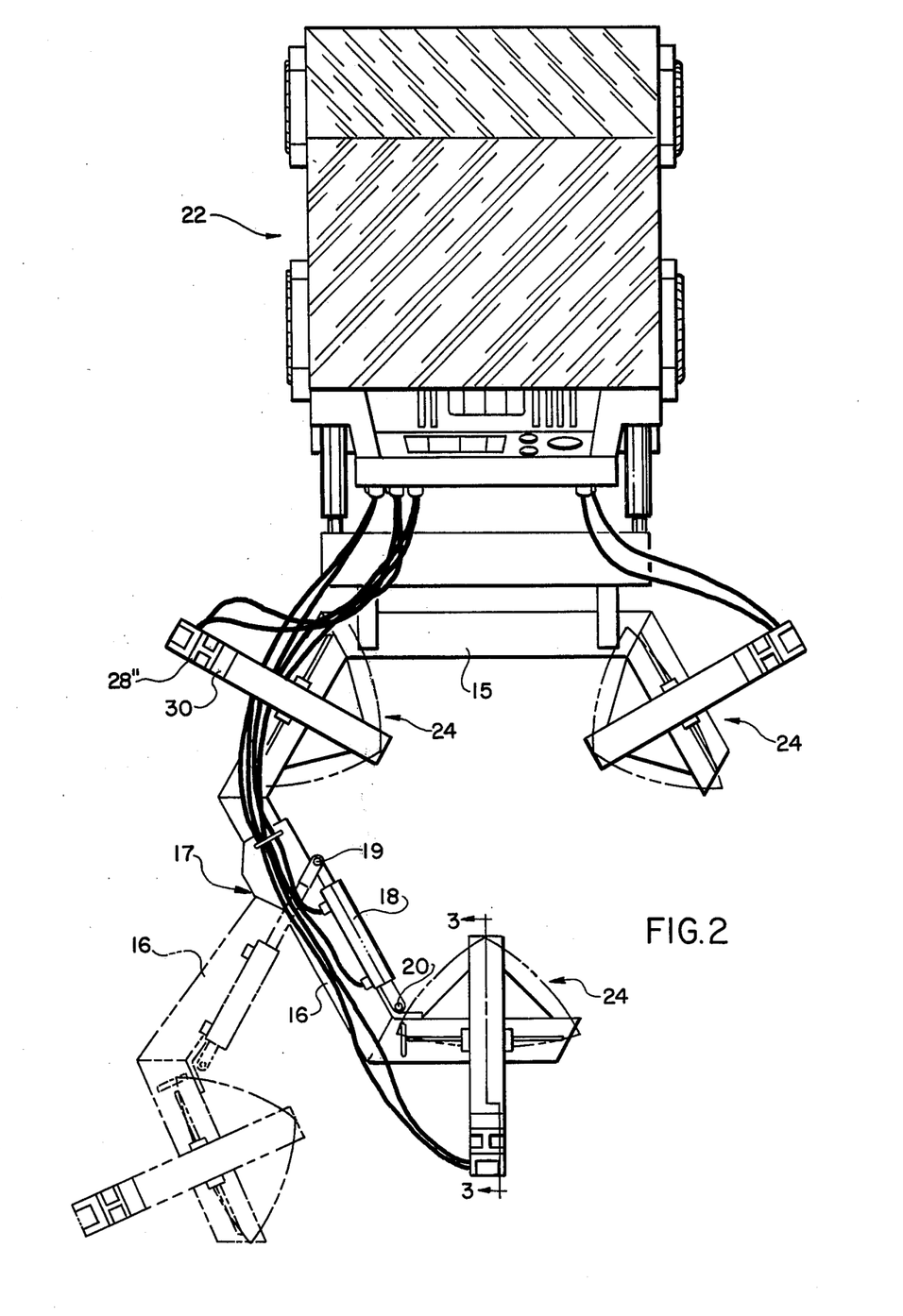
FIG. 2 is a plan view of the apparatus of FIG. 1.

Referring first to FIGS. 1 and 2, the tree excavating and transplanting apparatus of the present invention includes a generally horizontally disposed multi-sided frame 15 which defines a substantially enclosed space for overlying and substantially surrounding an area to be excavated or a tree to be removed or transplanted. As best seen in FIG. 2, one side 16 of the frame 15 is pivotably attached at 17 to the remaining portion of the frame 15 to permit outward pivotal movement thereof with respect to the enclosed space, as shown in dotted lines, to facilitate positioning of the frame 15 about a tree or the like to be excavated or transplanted. As is conventional in machinery of this type, actuation of the various moving parts thereof is effected hydraulically by utilizing any conventional hydraulic power source. Thus, outward pivoting of the side 16 of the frame 15 is effected hydraulically through a hydraulically actuated piston and cylinder assembly 18 affixed at one end 19 thereof to the frame 15 and the other end 20 thereof to the pivotable side 16 thereof. To facilitate transportation and positioning of the apparatus and to provide a hydraulic power supply and hydraulic controls therefor, the frame 15 may be mounted on a conventional vehicle, such as a tractor, truck or the like, indicated in FIGS. 1 and 2 generally at 22. The vehicle 22 should be of the type having a power operated lifting apparatus for raising and lowering the frame 15 to facilitate transportation of the apparatus and excavational operation thereof as more fully described hereinafter.

Figure 4:
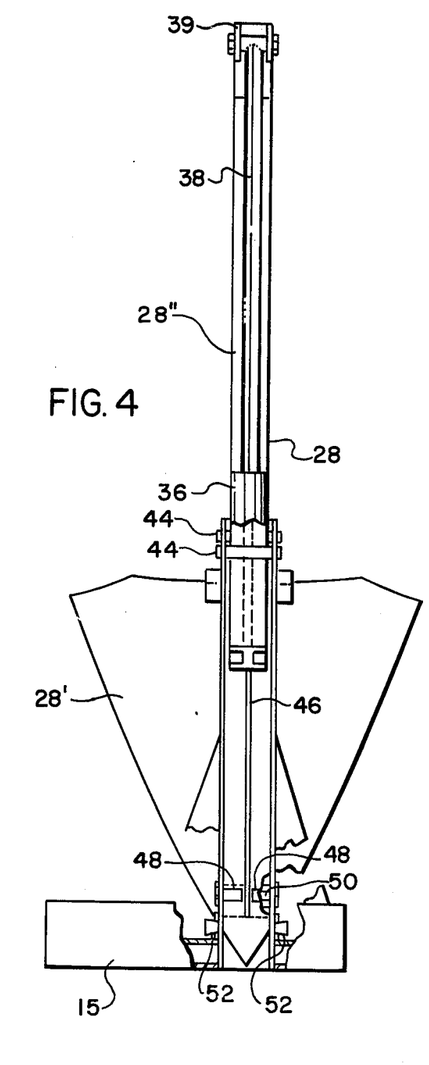
FIG. 4 is a rear elevational view of the blade assembly of FIG. 3 with the housing and the blade thereof partially broken away to show the guiding and aligning arrangement for the blade unit.

Three blade assemblies, indicated generally at 24 in FIGS. 1 and 2 and illustrated in greater detail in FIGS. 3 and 4, are mounted on the frame 15, one on each side thereof, each blade assembly 24 including a housing 26 fixedly mounted on the frame 15 within which housing 26 is disposed for reciprocation therewithin a blade unit 28 in proper angular relationship with respect to the area enclosed by the frame 15 such that upon reciprocation of each blade unit 28 the three blade units 28 converge to form a confinement area for the section of earth being excavated or the root system of a tree being transplanted. Each blade unit 28 includes a blade 28' for penetrating the area to be excavated upon reciprocation of the blade unit 28 and a stem 28" affixed to and extending upwardly from the blade 28' for reciprocation therewith, each housing 26 having a generally rectangular upwardly facing opening 30 through which the stem 28" of the blade unit 28 extends upwardly, and a downwardly facing opening 32 within which rests the blade 28' of the blade unit 28 and through which the blade 28' reciprocates downwardly during penetration of the are being excavated. To securely guide the blade units 28 and maintain them in regular and established converging paths of movement during downward reciprocal movement thereof, each housing 26 is also provided with a blade unit guiding and aligning assembly (described in greater detail hereinafter) mounted therein for receiving the blade unit 28 mounted in the housing, so that the blade units 28 are not deflected and do not deviate from the intended paths of travel during reciprocation thereof and thereby fail to properly converge for removing a section of earth from the area.

Operative reciprocal movement of the blade unit 28 in each housing 26 is imparted thereto be means of hydraulically actuated piston and cylinder assemblies, indicated generally at 34, one of which is operatively associated with each housing 26 and the blade unit 28 thereof. As best seen in FIG. 3, the cylnder 36 of each hydraulic assembly 34 is pivotably affixed at 37 to the base of its respective housing 26 at the outwardly facing side thereof. A reciprocating member or piston 38 is slidably disposed within the cylinder for reciprocation thereby, the piston 38 have an attachment bracket 39 pivotably affixed at 40 to the upwardly extending end of the piston 38, which bracket 39 is bolted to the stem 28" of the blade unit 28 at 42 whereby reciprocation of the piston 38 effects reciprocation of the blade unit 28. Each piston and cylinder assembly 34 is preferably independently actuable to facilitate uniform penetration by the blade units 28 into the area being excavated by sequential actuation of the blade units 28 in short increments, as more fully explained hereinafter.

The aforementioned guiding and aligning assembly is best seen in FIGS. 3, 4, 9 and 10. Affixed to and extending transversely across each housing 26 adjacent opposite sides of the upwardly facing opening 30 thereof is a pair of guide bars 44 between which is received the stem 28" of the blade unit 28, the guide bars 44 serving to maintain the stem 28" therebetween during reciprocation of the blade unit 28 (FIG. 3).

Rotatably mounted transversely on each housing 26 adjacent opposite sides of the lowermost extent of the downwardly facing opening is a set of three rollers disposed for rotational guiding engagement with opposite sides of the blade 28' during reciprocation thereof. This set of three rollers includes a primary roller 50 (FIGS. 3 and 9) mounted within the housing 26 adjacent the downwardly facing opening 32, inwardly with respect to the aforesaid enclosed space and extending substantially across the entire width of the housing 26, for rotational engagement with the inwardly facing or front side of the blade 28'. A pair of secondary rollers 52 is mounted on the outwardly facing vertical walls of the housing 26 (FIGS. 4 and 9) adjacent the downwardly facing opening 32 for rotational guiding engagement with the outwardly facing or rear side of the blade 28'. By thus guidingly engaging the blade 28' at a location immediately adjacent the downwardly facing opening 32 at the point of penetration of the ground or area being excavated, the set of rollers 50,52 effectively guides the blade 28' during its penetration of the area to be excavated while resisting binding and frictional forces imposed on the blade unit 28. Additionally, the extent of engagement of the blade 28' horizontally or traversely thereacross provided by the rollers 50,52 and specifically by the mounting of the rollers 52 on the outward sides of the housing 26 effectively resists any torsional forces acting on the blade unit 28 during reciprocation thereof, thereby preventing twisting of the blade 28' during use.

Additionally, a flange or fin 46 is formed on the rearwardly or outwardly facing side of the blade 28' of each blade unit 28 and extends vertically along substantially the entire length thereof. Mounted in each housing 26 immediately adjacent and on opposite sides of the reciprocal path of movement of the flange 46 is a pair of guide blocks 48 (FIGS. 4 and 10) for receiving and maintaining the flange 46 between the guide blocks 48 during reciprocation of the blade unit 28 to thereby prevent any deviative sidewise movement of the blade unit 28 during reciprocation thereof while cooperating with the rollers 50,52 to guide and maintain the blade in its regular and established path of movement.

In this manner, the guide blocks 48, and the set of rollers 50,52 of the housings 26 engage and guide the blades 28' immediately adjacent the location at which they penetrate the ground to be excavated and, in cooperation with the guide bars 44, guide and maintain the blade units 28 in regular and established paths of movement during reciprocation thereof and penetration of the area being excavated, while preventing deviative movement thereof with a minimal amount of contact between these guiding elements and the blade units 28. As a result, the frictional, binding and torsional forces which tend to be imposed on the blade units 28 during penetration of the earth are resisted and minimized.

Figure 7:
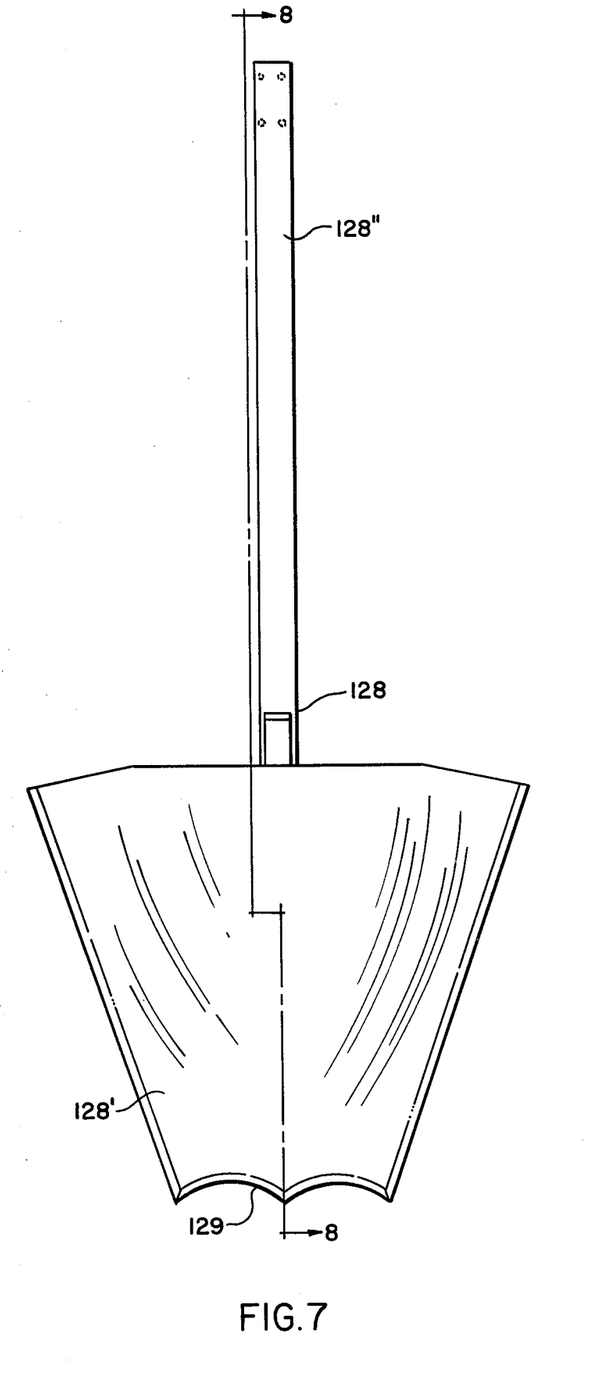
FIG. 7 is a front elevational view of the straight blade unit of the present invention.
Figure 8:
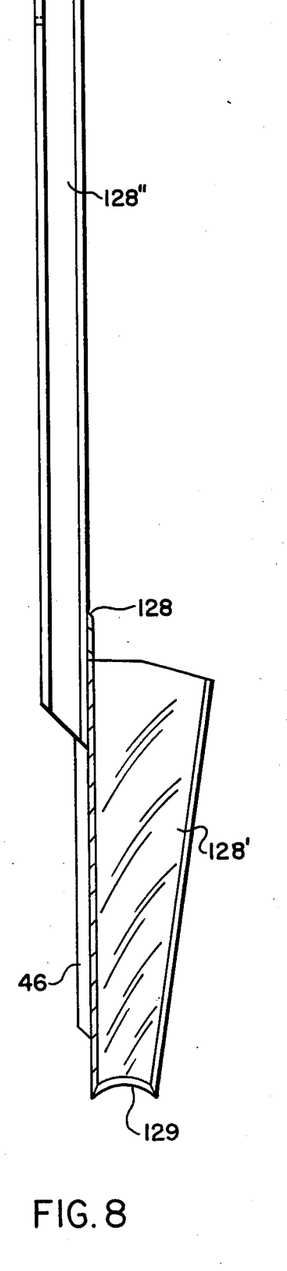
FIG. 8 is a vertical sectional view of the blade unit of FIG. 7 taken along line 8—8 of FIG. 7.
Figure 9:
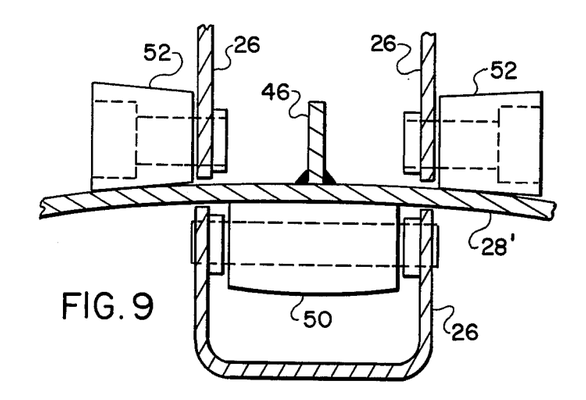
FIG. 9 is a sectional view through a housing and blade of the present invention taken along line 9—9 in FIG. 3.

In FIGS. 1-4, each blade assembly 24 is illustrated with a curved or arcuately-shaped blade unit 28 mounted in the housing 26 of the blade assembly 24, which arcuate blade unit 28 is shown in greater detail in FIGS. 5 and 6 as comprising a blade 28' and a stem 28" which are curved longitudinally about a common center so as to have the same radius of curvature, whereby the blade unit 28 will follow a generally arcuate path upon reciprocation thereof. However, in accordance with another feature of the present invention, each blade assembly 24 is also provided with a second blade unit 128 which may be mounted in the housing 26 selectively and alternatively with the arcuately-shaped blade unit 28, the second blade unit 128 being illustrated in greater detail in FIGS. 7 and 8 as comprising a blade 128' and a stem 128" which are both generally straight along the longitudinal or extending lengths thereof, ie. in the direction of reciprocation, to provide the blade unit 128 a straight extent so that it will follow a generally linear path of movement as it is reciprocated in the housing 26.

As a result of the location and the relatively limited degree of contact between the aforedescribed blade unit guiding and aligning assembly and a blade unit disposed therewithin, the blade unit guiding and aligning assembly will accept either the curved blade unit 28 or the straight blade unit 128 interchangably without requiring any adjustment in either the guiding assembly itself or in the angular relationship of the blades being utilized with respect to the excavation area. Additionally, as a result of the pivoted connections between the piston and cylinder assemblies 34 and the housings 26 and the attachment bracket 39, the curved blade units 28 and the straight blade units 128 may be quickly and easily interchanged by simply detaching the installed blade units from the attachment bracket 39 by removing the bolts at 42, removing the installed blade units from their housings 26, substituting therefor the other blade units, pivotably adjusting the piston and cylinder assemblies 34 for attachment of the pistons thereof to the stems of the new blade units, and affixing the stems thereof to the attachment bracket 39 with the removed bolts.

Figure 12:
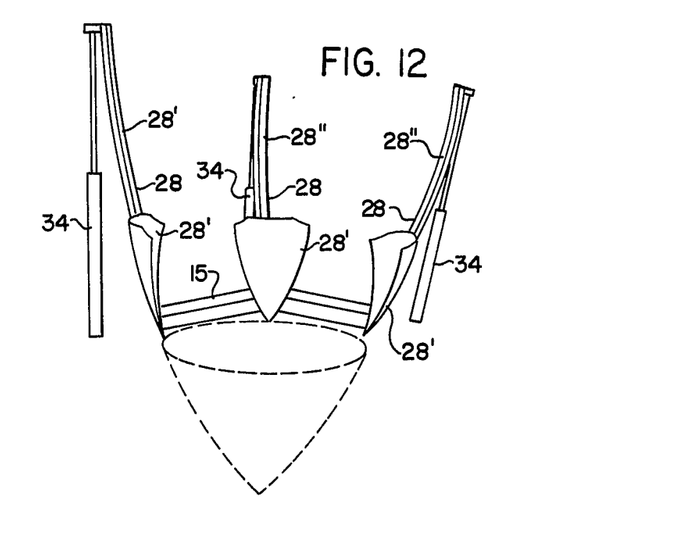
FIG. 12 is a diagrammatic view of an excavating and transplanting apparatus according to the present invention with three curved blade units thereof installed therein, illustrating in dotted lines the generally conical section of earth which may be removed thereby.
Figure 13:
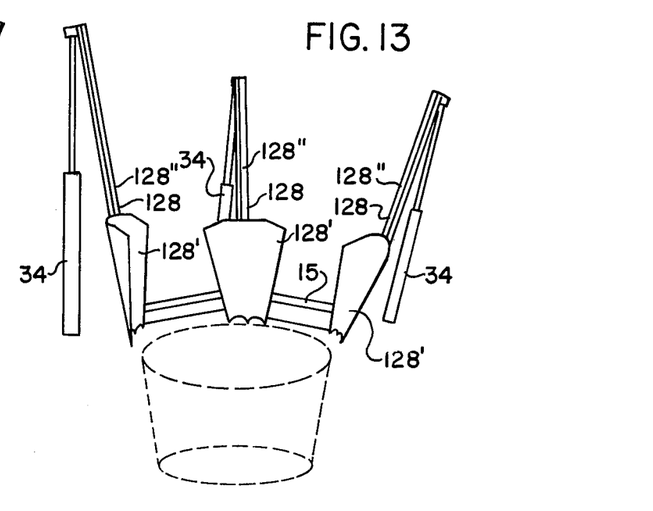
FIG. 13 is a diagrammatic view similar to FIG. 12 of an excavating and transplanting apparatus according to the present invention equipped with three staight blade units thereof, illustrating in dotted lines the generally frusto-conical section of earth which may be removed thereby.

Upon installation in each housing 26 of the arcuate blade unit 28 of the pair of blade units associated with each housing 26 and reciprocation of the arcuate blade units 28 as herein described, the blade units 28 follow converging arcuate paths, meeting, as illustated diagrammatically in FIG. 12, when the blade units 28 are forced fully downwardly to form a conelike confinement, whereby a generally conically shaped section of earth may be removed during excavation of an area or transplanting of a tree or like plant. As is evident from each of FIGS. 5, 6, and 9, each arcuate blade unit 28 is provided with a blade 28' having a generally pointed tip 29 to facilitate formation of this cone-like confinement and removal thereby of conical sections of earth. Alternatively, upon installation in each housing 26 of the straight blade unit 128 of the pair of blade units associated with each housing 26, and upon reciprocation of the straight blade units 128, the blade units 128 will follow converging linear paths, meeting as illustrated diagrammatically in FIG. 13, when the blade units 128 are forced fully downwardly to form a frustum-shaped confinement, whereby a generally frustum-shaped secion of earth may be removed during an excavational or transplanting operation. As is evident from each of FIGS. 7, 8, and 10, each straight blade unit 128 is provided with a blade 128' having a generally horizontally disposed serrated cutting edge 128 to facilitate such formation of a frustum-shaped confinement and removal thereby of frustum-shaped sections of earth.

Figures 10, 11:
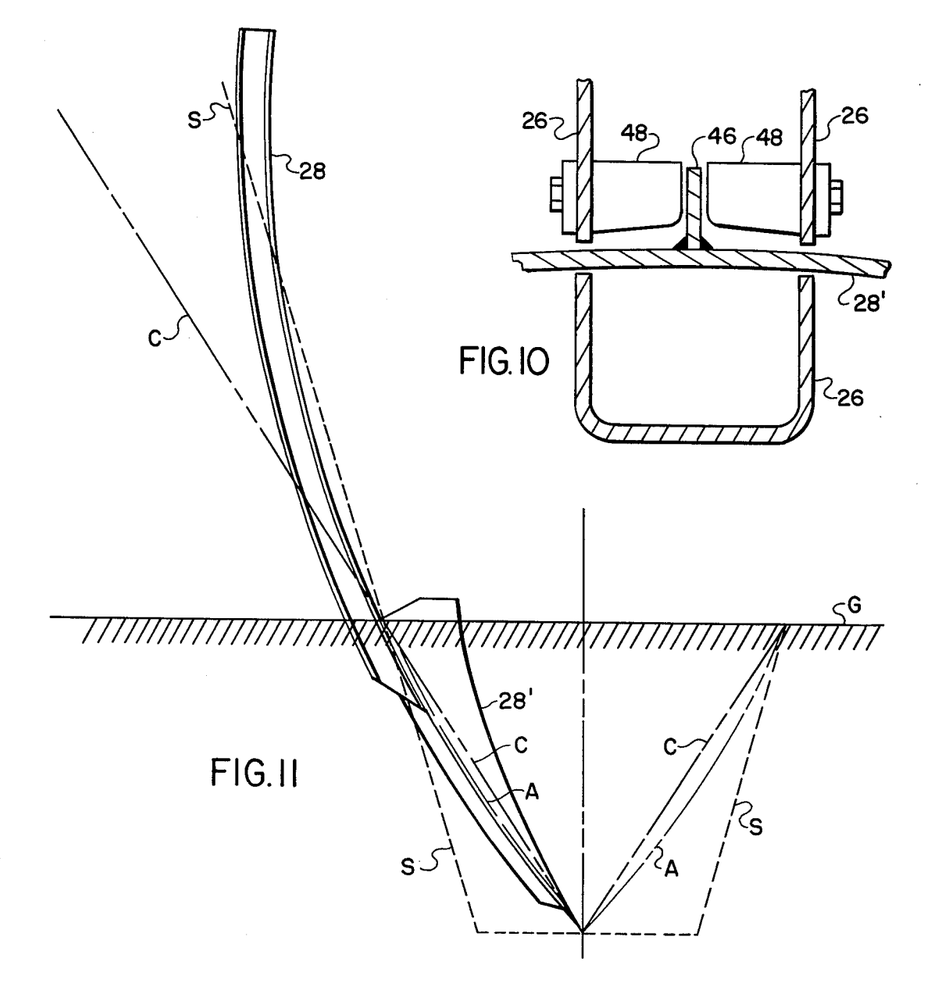
FIG. 10 is a sectional view through a housing and blade of the present invention taken along line 10—10 in FIG. 3.
FIG. 11 is a diagrammatic view illustrating the respective shapes of sections of earth which may be removed by conventional straight blade and stem units, and by the straight and curved blade and stem units of the present invention, and illustrating the angular disposition of the respective blade and stem units required to remove such sections.

As is explained hereinabove in greater detail, conventional devices typically utilize the straight blade units for the removal of both conical and frustum-shaped sections and, as a result, the horizontal dimension between the upwardly extending ends of the stems thereof is significantly greater when such devices are utilized for removing conical sections of earth. Since the apparatus of the present invention utilizes interchangable arcuate and straight blade units 28 and 128, respectively, instead of varying the angular orientation of straight blade units with respect to the excavation area to facilitate alternative excavation of conically-shaped or frustum-shaped sections of earth as is required with conventional devices, the horizontal dimension between the upwardly extending ends of the stems 28" or 128" of either blade units 28 or 128, respectively, is always approximately constant and relatively small in comparison with conventional devices. This feature of the present invention is illustrated diagrammatically in FIG. 11, wherein an arcuate blade unit 28 of the present invention is illustrated in its fully reciprocated downward position after penetration of an area to be excavated, the ground level being indicated by G. A broken line A indicates the generally conically-shaped section removed by the arcuate blade units 28 of the present invention. A second broken line S indicates the disposition of a straight blade unit 128 of the present invention of the penetration of the excavational area. Comparatively, a third broken line C illustrates the disposition a conventional straight blade unit would have upon penetration of the area to remove a correspondingly shaped conical section. Notably, the conically-shaped section removed by the arcuate blade units 28 of the present invention is slightly curved and therefore includes a greater volume of earth than the conical section removed conventionally. As a result, more of the root structure of a tree will be removed by the present invention and fewer roots will be encountered by the blades upon penetration of the area. FIG. 11 also illustrates the reduced horizontal dimension between the upwardly extending stems that is obtained from the present invention.

It is therefore apparent that the apparatus of the present invention is equally operable and manueverable in confined areas or adjacent buildings, trees, and other immovable obstacles regardless of whether it is equipped with the straight blade units 128 or the arcuate blade units 28. Additionally, in contrast to conventional devices which require retraction or adjustment of the blade units thereof to reduce the horizontal dimension therebetween to prepare them for highway transportation, the present apparatus does not require special preparation for highway transportation in order to meet prevailing vehicle width guidelines regardless of whether it is provided with straight or arcuate blade units.

As can be readily understood from the foregoing description, the apparatus of the present invention may be utilized both to prepare a hole into which a tree or similar plant may be placed for planting, and to excavate an existing tree or similar plant from the location in whch it has grown. In the preferred operation of the present apparatus for transplanting trees, the apparatus is initially operated to prepare such a hole by manuevering the apparatus so that the frame 15 thereof overlies the desired location of the hole and then lowering the frame 15 onto the ground. The hydraulic piston and cylinder assemblies 34 are then actuated separately and in rotation to force each blade of the blade units uniformly into the ground along converging paths defined by the above-described blade unit guiding and aligning assembly by a series of short incremental movements of each blade unit. When the blades have fully entered the ground, the lifting apparatus of the vehicle on which the excavational apparatus is mounted is actuated, raising the frame 15 and the section of earth confined within the blades from the ground. The section of earth thus removed may then be transported to either fill another existing hole or to be otherwise utilized, the section of earth being removed from the confines of the blades upon reaching its intended destination by actuating the hydraulic pistons and cylinders 34 to withdraw the blade units by raising them along diverging paths to their original positions within their respective housings 26 thereby permitting the section of earth to simply fall to its intended resting place.

Once the hole has been thus prepared and the section of earth removed from the blades, the apparatus is transported to and manuevered about a tree which is to be moved to and transplanted in the prepared hole. In manuevering the apparatus about the tree, the hydraulic piston and cylinder 18 is initially actuated to pivot the side 16 of the frame 15 outwardly, the apparatus then being positioned about the tree so that the center thereof is generally equidistant from the sides of the frame 15 at which time the side 16 is pivoted inwardly to substantially enclose the tree within the frame 15. The frame 15 is then lowered onto the ground surrounding the tree, and the hydraulic piston and cylinder assemblies 34 are again actuated sequentially and incrementally to penetrate the earth surrounding the tree and converge to confine between the blades, the root system of the tree and a surrounding section of earth. After the blades have fully entered the ground, the lifting apparatus is actuated to raise the tree and its root system and surrounding section of earth for transportation to the prepared hole. To place the tree in the prepared hole, the frame 15 is positioned about the hole and the lifting apparatus is actuated to lower the frame onto the ground surrounding the hole thereby lowering the root system of the tree and its accompanying section of earth into the hole. The hydraulic cylinder and piston assemblies 34 are then actuated to fully raise the blade units to their original positions leaving the root system and section of earth resting in the hole.

Since the present apparatus may be utilized to both prepare holes and remove trees from the location in which it has grown, the holes created by the apparatus and the masses of earth and roots of plants being moved are of essentially the same size and shape, thereby reducing to a minimum the amount of backfilling required when utilizing the present invention. Of course, it is to be understood that the present invention may also be used separately for preparing holes or for excavating and removing trees or plants from the ground for storage for later transplanting.

The present invention has been hereinabove described in detail with regard to its preferred embodiment in a tree excavating and transplanting apparatus utilizing three blade and stem units. However, as those skilled in the art will readily understand, modifications and variations may be resorted to without departing from the substance or scope of the present invention. Specifically, it is contemplated that the features of the present invention may be equally adaptable for use in a tree excavating and transplanting apparatus utilizing other combinations or numbers of blade units, such as four or more. Such modifications and variations are within the scope of the present invention, which is intended to be limited only by the appended claims and equivalents thereof.

I claim:

1. An apparatus for excavating and transplanting trees and the like comprising a generally horizontally disposed multisided frame defining a substantially enclosed space for overlying and substantially surrounding an area to be excavated, and a plurality of blade assemblies, being mounted on the sides of said frame, each said blade assembly including a housing mounted on said frame, said housing having a downwardly facing opening, a blade disposed in said housing for reciprocation through said downwardly facing opening thereof for penetrating said area to be excavated, operating means associated with said blade for imparting reciprocal movement thereto, and means for guiding and aligning said blade during reciprocation thereof to prevent deviative movement thereof, said guiding and aligning means including a plurality of rollers rotatably mounted in said housing adjacent said downwardly facing opening in rotational engagement with opposite sides of said blade during reciprocation thereof to guide said blade as it penetrates the area to be excavated and to maintain said blade therebetween in a regular and established path of movement while resisting torsional, binding and frictional forces imposed on said blade during penetration of said area to be excavated.

2. An apparatus for excavating and transplanting trees and the like according to claim 1 and characterized further in that at least one side of said frame is pivotable outwardly with respect to said enclosed space to facilitate positioning of said frame about a tree or the like to be excavated or transplanted, and in that said means for imparting reciprocal movement includes hydraulic actuating means, each said hydraulic actuating means being independently actuable for independent reciprocation of its respective blade and being detachably associated with its respective blade to facilitate removal of said blade from said housing and replacement thereof with another blade.

3. An apparatus for excavating and transplanting trees and the like according to claim 1 and characterized further in that said blade includes a flange formed thereon and extending in the direction of reciprocation along substantially the entire length thereof, and in that said guiding and aligning means includes a plurality of guide blocks mounted in said housing immediately adjacent and on opposite sides of said flange of said blade to maintain said flange therebetween during reciprocation of said blade to prevent deviative sidewise movement of said blade, while cooperating with said plurality of rollers to guide and maintain said blade in said regular and established path of movement during reciprocation thereof.

4. An apparatus for excavating and transplanting trees and the like according to either claim 1 or claim 3 and characterized further in that said housing has an upwardly facing opening, in that each said blade assembly includes a stem rigidly affixed to and extending upwardly from said blade through said upwardly facing opening for reciprocation therewith, and in that said guiding and aligning means includes a plurality of guide bars affixed to and extending across said housing adjacent said upwardly facing opening on opposite sides of said stem to maintain said stem therebetween during reciprocation thereof with said blade, thereby cooperating with said plurality of rollers to guide and maintain said blade in said regular and established path of movement during reciprocation thereof.

5. An apparatus for excavating and transplanting trees and the like according to claim 1 and characterized further in that said housing has an upwardly facing opening and each said blade assembly includes a stem rigidly affixed to and extending upwardly from said blade through said upwardly facing opening for reciprocation therewith, said blade and said stem being curved longitudinally about a common center with the same radius of curvature forming an arcuate blade unit inwardly curving toward said enclosed space whereby each said arcuate blade unit follows a generally arcuate path upon reciprocation thereof for removing a generally conically-shaped section from said area to be excavated.

6. An apparatus for excavating and transplanting trees and the like according to claim 1 and characterized further in that said housing has an upwardly facing opening and each said blade assembly includes a stem rigidly affixed to and extending upwardly from said blade through said upwardly facing opening for reciprocation therewith, said blade and said stem being generally straight forming a generally straight blade unit, whereby each said blade unit follows a generally linear path upon reciprocation thereof for removing a generally frustum shaped section from said area to be excavated.

7. An apparatus for excavating and transplanting trees and the like comprising a generally horizontally disposed multi-sided frame defining a substantially enclosed space for overlying and substantially surrounding an area to be excavated, and a plurality of blade assemblies being mounted on the sides of said frame, each said blade assembly including a housing mounted on said frame, said housing having a downwardly facing opening and an upwardly facing opening, a blade disposed in said housing for reciprocation through said downwardly facing opening thereof for penetrating said area to be excavated, a stem affixed to and extending upwardly from said blade through said upwardly facing opening for reciprocation therewith, means affixed to said stem for imparting reciprocal movement thereto, said blade and stem being curved longitudinally about a common center with the same radius of curvature forming an arcuate blade unit inwardly curving toward said enclosed space whereby said arcuate blade unit follows a generally arcuate path upon reciprocation thereof for removing a generally conically shaped section from said area to be excavated, and bearing means in said housing for guiding and aligning said blade during reciprocation thereof in said arcuate path to prevent deviative movement of said blade.

8. An apparatus for excavating and transplanting trees and the like according to claim 7 and characterized further in that at least one side of said frame is pivotable outwardly with respect to said enclosed space to facilitate positioning of said frame about a tree or the like to be excavated or transplanted, and in that said means for imparting reciprocal movement includes hydraulic actuating means, each said hydraulic actuating means being independently actuable for independent reciprocation of its respective blade unit and being detachably affixed to its respective stem to facilitate removal of said blade unit from said housing and replacement thereof with another blade unit.

9. An apparatus for excavating and transplanting trees and the like comprising a generally horizontally disposed multisided frame defining a substantially enclosed space for overlying and substantially surrounding an area to be excavated, and a plurality of blade assemblies, being mounted on the sides of said frame, each said blade assembly including a housing mounted on said frame and having a downwardly facing opening and an upwardly facing opening formed therein, a pair of blade units associated with each said housing and constructed for selective and alternative mounting therein for reciprocation therewithin and through said downwardly facing opening thereof, each blade unit having a blade for penetrating said area to be excavated upon reciprocation of said blade unit and a stem affixed to said blade for reciprocation therewith and extending from said blade upwardly through said upwardly facing opening, one of said blade units being substantially straight along the extending length thereof and one of said blade units being substantially arcuate along the extending length thereof, operating means associated with said housing for imparting reciprocal movement to the blade unit mounted therein, said operating means including a reciprocating member having detachable attachment means selectively engagable with either blade unit of said pair of blade units to effect reciprocation thereof, and guide means mounted in said housing for receiving therein the blade unit mounted in said housing and for guiding and aligning the blade unit during reciprocation thereof to prevent deviative movement thereof, said guide means being constructed to receive therein either blade unit of said pair of blade units.

10. An apparatus for excavating and transplanting trees and the like according to claim 9 and characterized further in that said guide means includes a plurality of rollers rotatably mounted in said housing adjacent said downwardly facing opening for rotational engagement with opposite sides of the blade of said blade unit mounted in said housing during reciprocation thereof and a plurality of guide bars affixed to and extending across said housing adjacent said upwardly facing opening for receiving therebetween the stem of said blade unit mounted in said housing to maintain said stem therebetween during reciprocation thereof with said blade unit, said plurality of rollers and said plurality of guide bars cooperating to maintain said blade unit mounted in said housing in a regular and established path of movement during reciprocation thereof while resisting torsional, binding, and frictional forces imposed on said blade unit.

11. An apparatus for excavating and transplanting trees and the like according to claim 10 and characterized further in that each said blade includes a flange formed thereon and extending in the direction of reciprocation along substantially the entire length thereof, and said guide means includes a plurality of guide blocks mounted in said housing for receiving therebetween the flange of the blade of said blade unit mounted in said housing to maintain said flange therebetween during reciprocation of said blade unit to prevent deviative sidewise movement of said blade unit, while cooperating with said plurality of rollers and said plurality of guide bars to guide and maintain said blade unit in a regular and established path of movement during reciprocation thereof.

12. An apparatus for excavating and transplanting trees and the like according to claim 9 and characterized further in that said operating means includes a hydraulic cylinder pivotably attached to said frame, said reciprocating member of said operating means including a hydraulically actuated reciprocatory piston slidably disposed within and extending from said hydraulic cylinder, said detachable attachment means being affixed to said piston at the extending end thereof for selective engagement with the stem of either blade unit of said pair of blade units to effect reciprocation thereof.

13. An apparatus for excavating and transplanting trees and the like according to claim 11 and characterized further in that said blade and said stem of said arcuate blade unit are curved about a common center with the same radium of curvature, said arcuate blade unit being mountable in said housing with the arc thereof curving inwardly toward said enclosed space whereby each said arcuate blade unit follows a generally arcuate path upon reciprocation thereof for removing a generally conically shaped section from said area to be excavated.

* * * * *